United States Patent
Tien (10) Patent No.: US 9,332,873 B2
(45) Date of Patent: May 10, 2016

(54) LID STRUCTURE CONFIGURED FOR EASY DISASSEMBLY AND CLEANING

(71) Applicant: Jung-Jung Tien, Taipei (TW)

(72) Inventor: Jung-Jung Tien, Taipei (TW)

(*) Notice: Subject to any disclaimer, the term of this patent is extended or adjusted under 35 U.S.C. 154(b) by 680 days.

(21) Appl. No.: 13/789,800

(22) Filed: Mar. 8, 2013

(65) Prior Publication Data

US 2014/0251153 A1    Sep. 11, 2014

(51) Int. Cl.
| | | |
|---|---|---|
| *A47J 31/06* | (2006.01) | |
| *A47G 19/14* | (2006.01) | |
| *A23F 3/00* | (2006.01) | |
| *A47J 31/18* | (2006.01) | |
| *A47J 31/44* | (2006.01) | |
| *B65D 85/804* | (2006.01) | |
| *A47J 31/02* | (2006.01) | |
| *A47G 19/16* | (2006.01) | |

(52) U.S. Cl.
CPC .............. *A47J 31/0636* (2013.01); *A47J 31/18* (2013.01); *A47J 31/446* (2013.01); *A47J 31/4407* (2013.01); *A47G 19/14* (2013.01); *A47G 19/16* (2013.01); *A47J 31/02* (2013.01); *B65D 85/8043* (2013.01)

(58) Field of Classification Search
CPC ... A47J 31/02; A47J 31/3614; A47J 31/0663; A47J 31/54; A47J 31/005; B65D 85/8043; A47G 19/14; A47G 19/16
USPC ............... 99/322, 323, 285, 289 R, 295, 299, 99/302 R, 305, 306, 317, 279
See application file for complete search history.

(56) References Cited

U.S. PATENT DOCUMENTS

| | | | | |
|---|---|---|---|---|
| 4,785,723 A * | 11/1988 | Sheen | ...................... | A47J 31/18 99/279 |
| 5,632,193 A * | 5/1997 | Shen | ...................... | A47J 31/02 99/285 |
| 5,725,765 A * | 3/1998 | Shen | ...................... | A47J 31/0615 210/238 |
| 5,855,160 A * | 1/1999 | Shen | ...................... | A47G 19/14 99/279 |
| 5,862,739 A * | 1/1999 | Lin | ...................... | A47J 31/02 99/285 |
| 5,913,961 A * | 6/1999 | Chmiel | ................. | A47J 31/605 99/286 |
| 5,943,946 A * | 8/1999 | Chen | ....................... | A47J 31/20 99/297 |
| 6,026,733 A * | 2/2000 | Orrico | ...................... | A23F 5/26 99/302 R |
| 6,298,771 B1 * | 10/2001 | Calvento | ................. | A47J 31/02 99/306 |
| 6,327,965 B1 * | 12/2001 | Lin Tien | ................. | A47J 31/02 99/299 |
| 6,343,542 B1 * | 2/2002 | Shen | ....................... | A47J 31/02 99/299 |
| 6,481,337 B1 * | 11/2002 | Guu | ....................... | A47J 31/005 99/285 |
| 2009/0272276 A1 * | 11/2009 | Lin Tien | ............... | A47J 31/061 99/298 |

* cited by examiner

*Primary Examiner* — Dana Ross
*Assistant Examiner* — Hemant Mathew
(74) *Attorney, Agent, or Firm* — Bacon & Thomas, PLLC (57) ABSTRACT

The present invention is to provide a lid structure including a lid having a bottom side provided with an opening and concavely provided with an assembly space corresponding in position to the opening and having a first threaded connection portion protrudingly provided on an inner wall of the lid and extending toward the opening; a gasket fitted around the outer periphery of the first threaded connection portion and protrudingly provided with a pulling tab which extends toward the opening; and a filter having a second threaded connection portion provided on a top side thereof and threadedly engageable with the first threaded connection portion. Thus, when it is desired to clean the lid, the user only has to rotate the filter to easily detach the filter from the lid and pull the pulling tab to rapidly remove the gasket from the lid for cleaning, without using any tool.

10 Claims, 6 Drawing Sheets

LID STRUCTURE CONFIGURED FOR EASY DISASSEMBLY AND CLEANING

FIELD OF THE INVENTION

The present invention relates to a lid structure, more particularly to a lid configured to be threadedly engageable with a filter and having a gasket fitted therein and around the filter. Thus, when it is desired to clean the lid, the user only has to rotate the filter to easily detach the filter from the lid, and pull a pulling tab of the gasket to rapidly remove the gasket from the lid for cleaning, without using any tool.

BACKGROUND OF THE INVENTION

More and more research reports and medical journals have shown that drinks like tea and coffee contain ingredients beneficial to the human health. For example, a tea infusion contains such wholesome ingredients as carbohydrates, proteins, free amino acids, fatty acids, polyphenols, organic acids, plant alkaloids, and minerals. A cup of coffee, on the other hand, contains caffeine, antioxidants, polyphenols, proteins, tannins, linoleic acid, alkaloids, and so on. Therefore, many people drink tea or coffee during or after work in order to reinvigorate themselves and maintain or enhance health.

Nowadays, a variety of portable brewer structures are commercially available to facilitate the making of tea and coffee. One such brewer is now described with reference to FIG. 1 and FIG. 2 by way of example. As shown in the drawings, a brewer 1 includes a container 10, a lid 12, a filter 14, and a drinking cup 16. The container 10 has an opening on the top side. A receiving space 100 is provided in the container 10, corresponds in position to the opening, and is configured for holding a liquid. External threads 102 are circumferentially provided on the outer periphery, and adjacent to the top side, of the container 10. The lid 12 has a second opening on its bottom side. An assembly space 120 is concavely provided in the lid 12 and corresponds in position to the second opening. The inner bottom surface of the lid 12 is protrudingly provided with a first engaging portion 121 which extends toward the second opening. Internal threads 122 are circumferentially provided on the inner periphery, and adjacent to the bottom side, of the lid 12. The internal threads 122 are threadedly engageable with the external threads 102 to secure the lid 12 to the container 10. The filter 14 is cup-shaped, is composed of a perforated frame 141 and a filter screen 142 connected thereto, and is configured for receiving a brewing material (e.g., tea leaves or ground coffee). A second engaging portion 143 is protrudingly provided on the outer periphery, and adjacent to the top side, of the frame 141. The second engaging portion 143 can engage with the first engaging portion 121 to secure the filter 14 to the lid 12.

Figure 1:
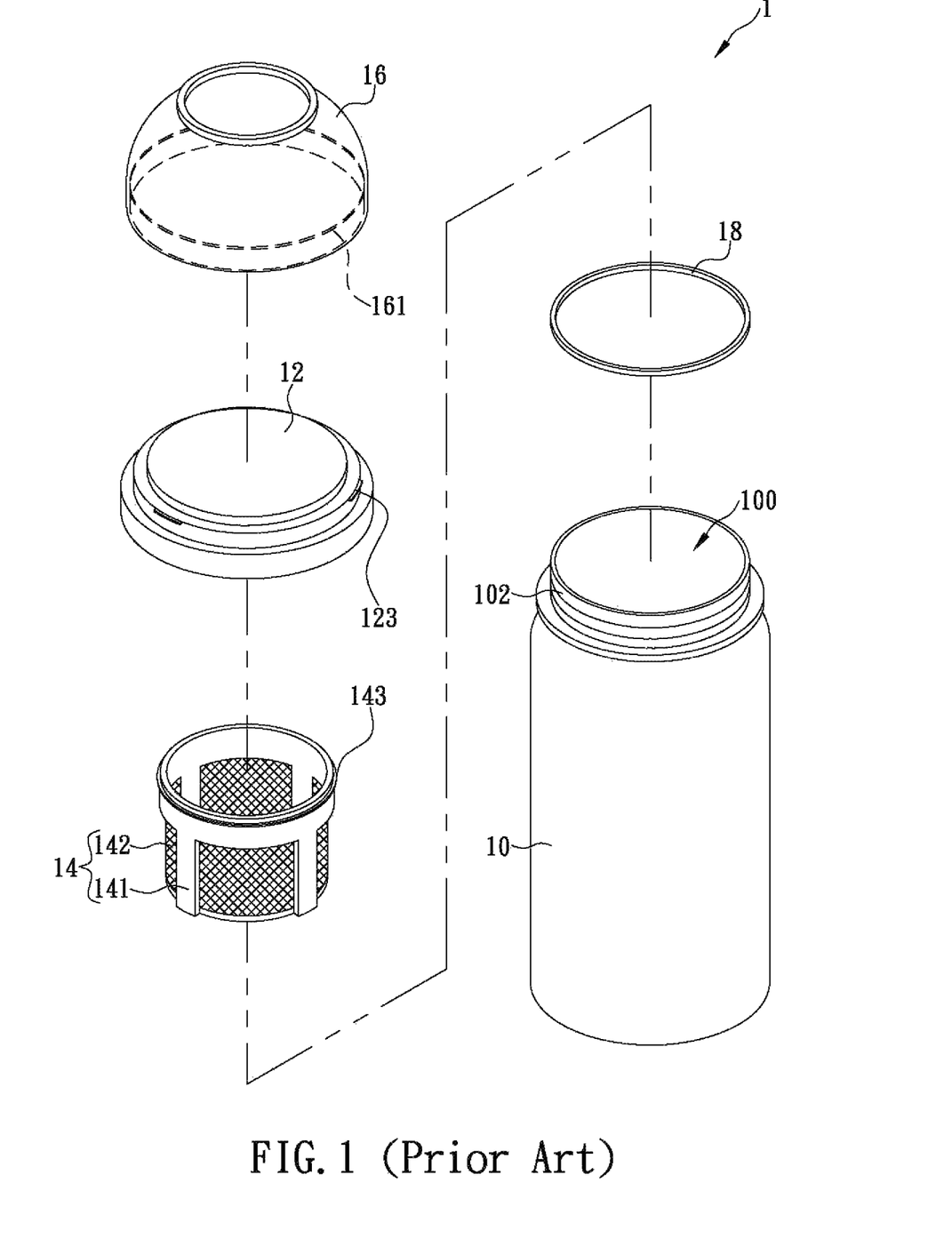
FIG. 1 is an exploded perspective view of a conventional brewer.
Figure 2:
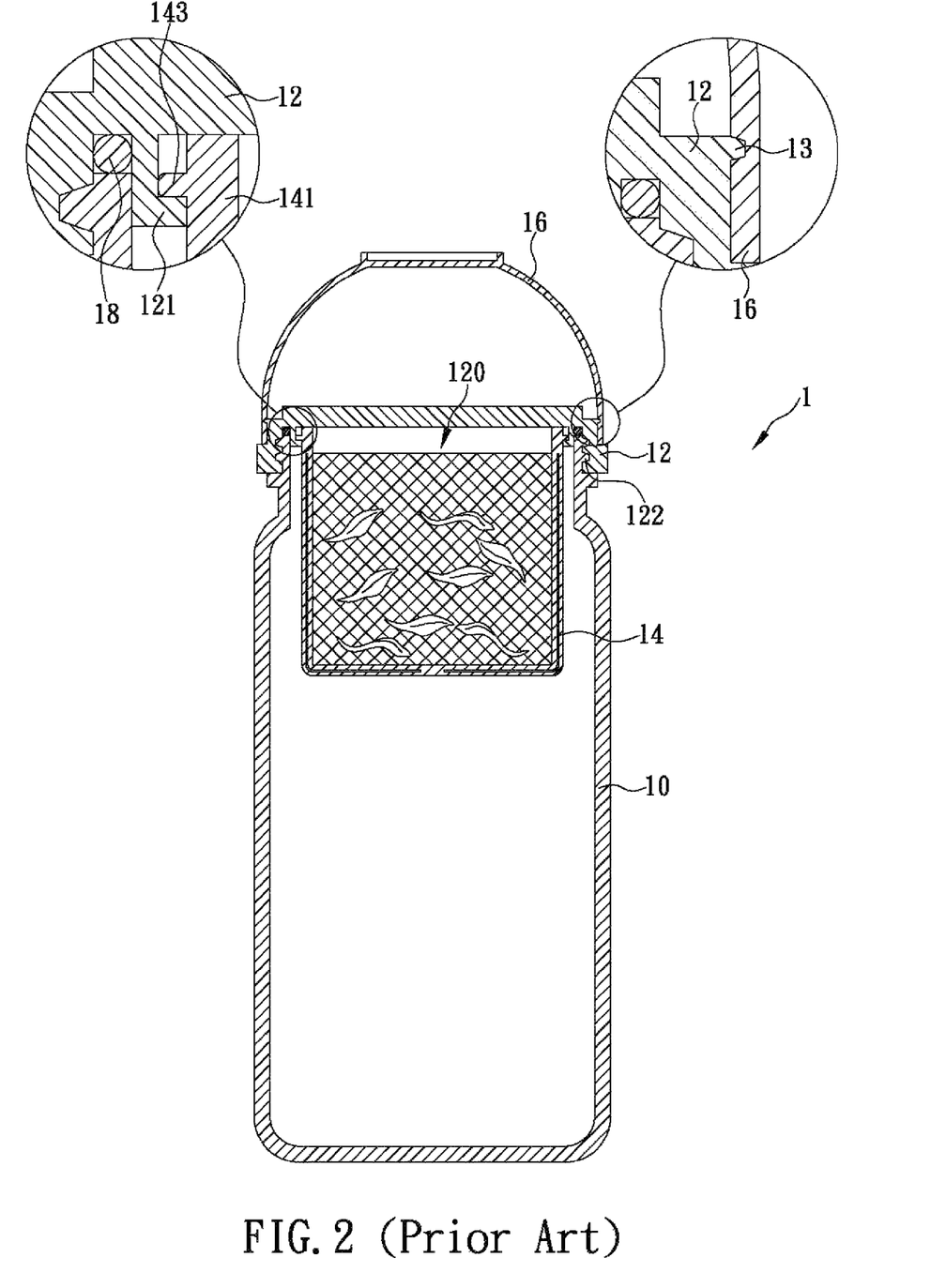
FIG. 2 is a sectional view of a conventional brewer.

As shown in FIG. 1 and FIG. 2, a plurality of blocks 123 are protrudingly provided along the outer periphery, and adjacent to the top side, of the lid 12, and a groove 161 is concavely provided on the inner periphery, and adjacent to the bottom side, of the drinking cup 16. When the drinking cup 16 is assembled to the top side of the lid 12, the blocks 123 are engaged in the groove 161, thereby securing the drinking cup 16 to the lid 12. In order to prevent the liquid in the container 10 from leaking through the gap between the internal threads 122 and the external threads 102 once the lid 12 is threadedly connected to the container 10, a gasket 18 is additionally provided between the first engaging portion 121 and the internal threads 122 of the lid 12. The gasket 18 is ring-shaped and, after the internal threads 122 are threadedly engaged with the external threads 102, provides water-tightness between the container 10 and the lid 12.

However, the inventor of the present invention has found that the brewer 1 described above is difficult to clean. First of all, referring again to FIG. 1 and FIG. 2, now that the lid 12 and the filter 14 are designed to connect with each other by mutual engagement, the filter 14 cannot be assembled to or removed from the lid 12 for cleaning unless the user presses and consequently deforms the frame 141 with his or her thumb and fingers to bring the second engaging portion 143 either into or out of engagement with the first engaging portion 121. The frame 141, therefore, is subject to permanent deformation after long-term use or if inadvertently pressed with too great a force. Should the frame 141 be permanently deformed, it will be impossible to securely position the filter 14 on the lid 12, and, as a result, the brewing material in the filter 14 may escape into the liquid in the container 10 during the brewing process, making the brew undrinkable.

Secondly, referring to FIG. 1 and FIG. 2, the spacing between the first engaging portion 121 and the internal threads 122 is typically less than the width of the gasket 18 so that the gasket 18 is tightly positioned in, and is prevented from coming off, the lid 12. However, the gasket 18, too, needs cleaning after long-term use. With the aforesaid configuration, a user may have problem taking out the gasket 18 directly with his or her thumb and fingers. In fact, the gasket 18 must be dug out with a pointed object, which not only adds to the difficulty of cleaning the gasket 18, but also may damage the gasket 18, compromising the water-tightness between the container 10 and the lid 12.

Therefore, one major issue facing the brewing device industry is to overcome the foregoing drawbacks of the existing brewers, particularly in terms of cleaning, and to develop new products capable of giving users a better use experience.

BRIEF SUMMARY OF THE INVENTION

In view of, and in order to effectively solve, the aforementioned problems associated with cleaning a conventional brewer, especially the difficulty in disassembling the lid, the inventor of the present invention conducted extensive research and experiment and finally succeeded in developing a lid structure configured for easy disassembly and cleaning as disclosed herein.

It is an object of the present invention to provide a lid structure configured for easy disassembly and cleaning so that the various components of a lid can be detached and cleaned with ease. The lid structure includes a lid, a gasket, and a filter. The bottom side of the lid is provided with an opening. An assembly space is concavely provided in the lid and corresponds in position to the opening. A first threaded connection portion is protrudingly provided on an inner wall of the lid and extends toward the opening, wherein the inner wall corresponds in position to the opening. The inner periphery of the first threaded connection portion is provided with threads. The gasket is fitted around the outer periphery of the first threaded connection portion and is protrudingly provided with a pulling tab. The pulling tab extends toward the opening. The filter includes a hollow frame and at least one filter screen. The hollow frame has a middle section peripherally formed with at least one hole. The top side of the hollow frame is provided with a second threaded connection portion. The outer periphery of the second threaded connection portion is provided with threads. The threads on the outer periphery of the second threaded connection portion are threadedly engageable with the threads on the inner periphery of the first threaded connection portion, so as for the second threaded connection portion to connect with the first threaded connection portion in the assembly space, thereby fixing the top side of the filter in the lid and allowing the bottom side of the filter to be exposed outside the opening of the lid. The at least one filter screen coats the at least one hole and a bottom through hole of the hollow frame such that a receiving space is formed in the hollow frame. A brewing material (e.g., tea leaves, ground coffee, etc.) can be placed into the receiving space through a top through hole of the hollow frame. When it is desired to clean the lid, the user only has to rotate the filter, and the filter can be easily detached from the lid. In addition, the pulling tab is so designed that the gasket can be facilely and rapidly removed for cleaning. Since no tool is required for removing the gasket, the gasket can be conveniently cleaned.

It is another object of the present invention to provide the foregoing lid structure, wherein the threads on the inner periphery of the first threaded connection portion and on the outer periphery of the second threaded connection portion change positions to the corresponding outer and inner peripheries respectively, and wherein the gasket is fitted around the outer periphery of the second threaded connection portion. In this configuration, the gasket can be rapidly removed by rotating and removing the filter, and convenience of disassembly is further increased.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 3:
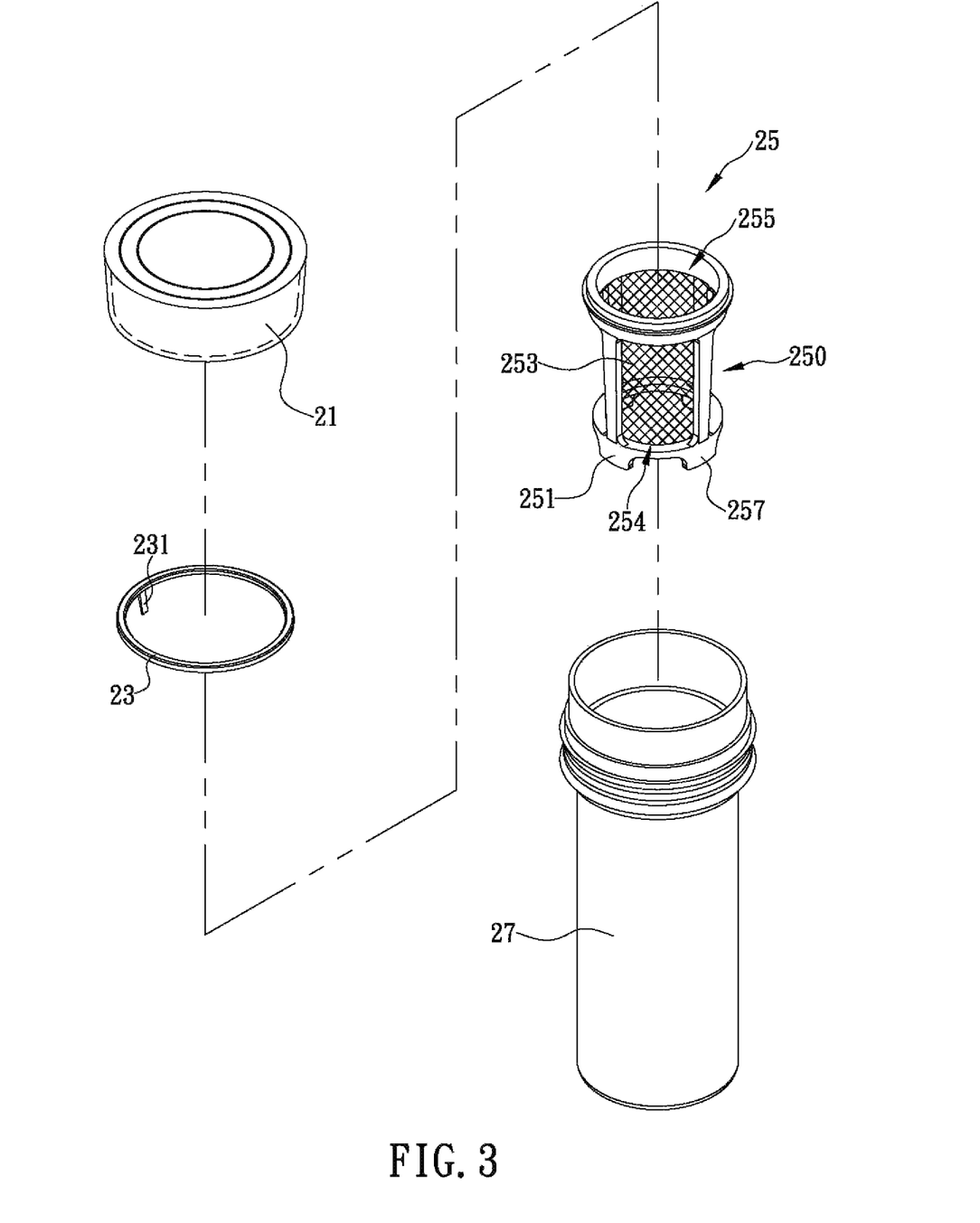
FIG. 3 is an exploded perspective view of the first embodiment of the present invention.
Figure 4:
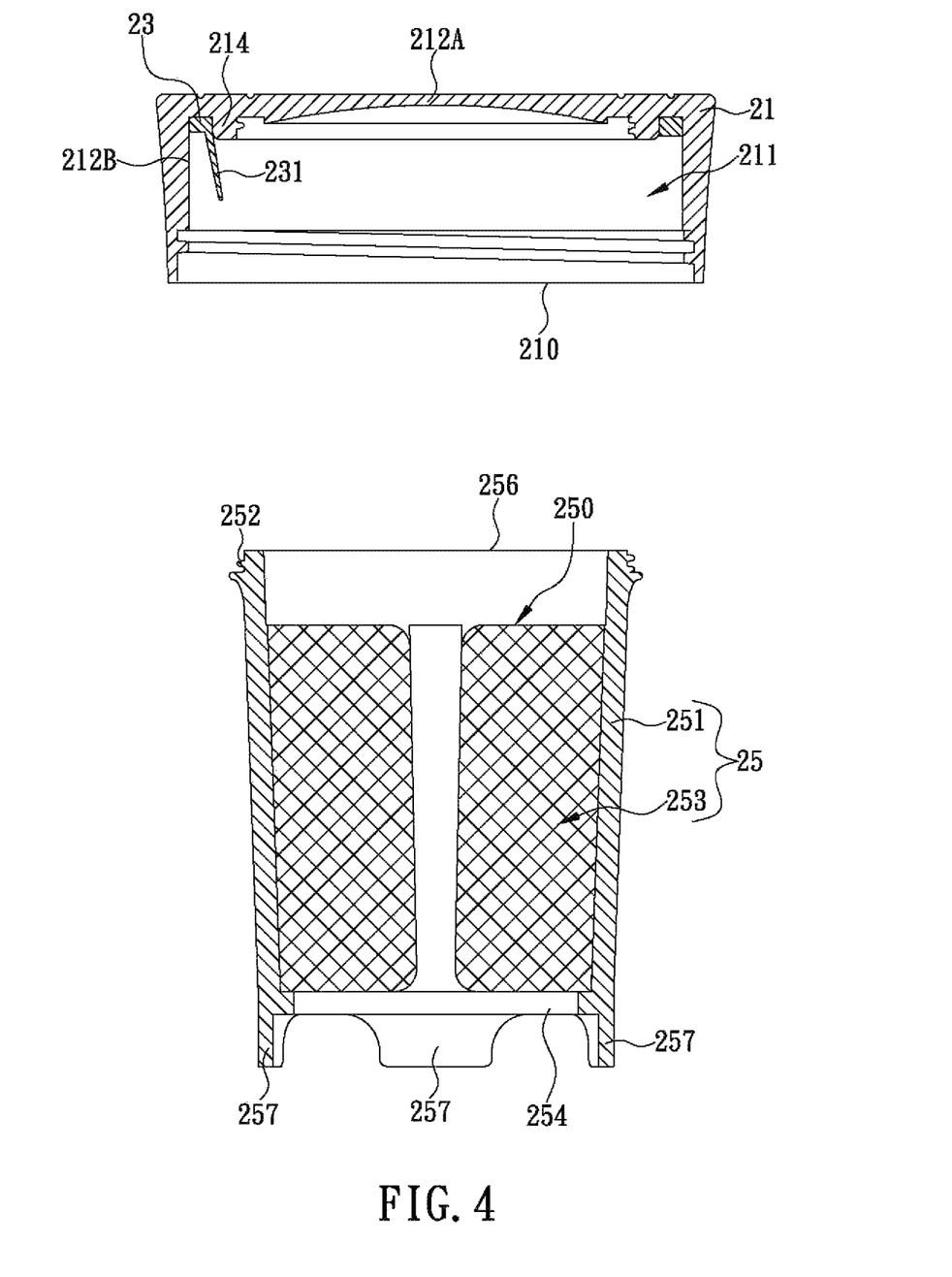
FIG. 4 is an exploded sectional view of the first embodiment of the present invention.

The present invention discloses a lid structure configured for easy disassembly and cleaning. In the first embodiment as shown in FIG. 3 and FIG. 4, the lid structure includes a lid 21, a gasket 23, and a filter 25. The bottom side of the lid 21 is provided with an opening 210. An assembly space 211 is concavely provided in the lid 21 and corresponds in position to the opening 210 so that the gasket 23 and the filter 25 can be received in the assembly space 211 and fixed to the lid 21. The lid 21 has an inner wall 212A which corresponds in position to the opening 210 and which is protrudingly provided with a first threaded connection portion 214 extending toward the opening 210. The inner periphery of the first threaded connection portion 214 is provided with threads, and the first threaded connection portion 214 is spaced from an inner wall 212B of the lid 21 that is adjacent to the opening 210. The inner wall 212B of the lid 21 that is adjacent to the opening 210 is provided with threads which enable threaded connection between the lid 21 and an opening on the top side of a container 27.

Figure 5:
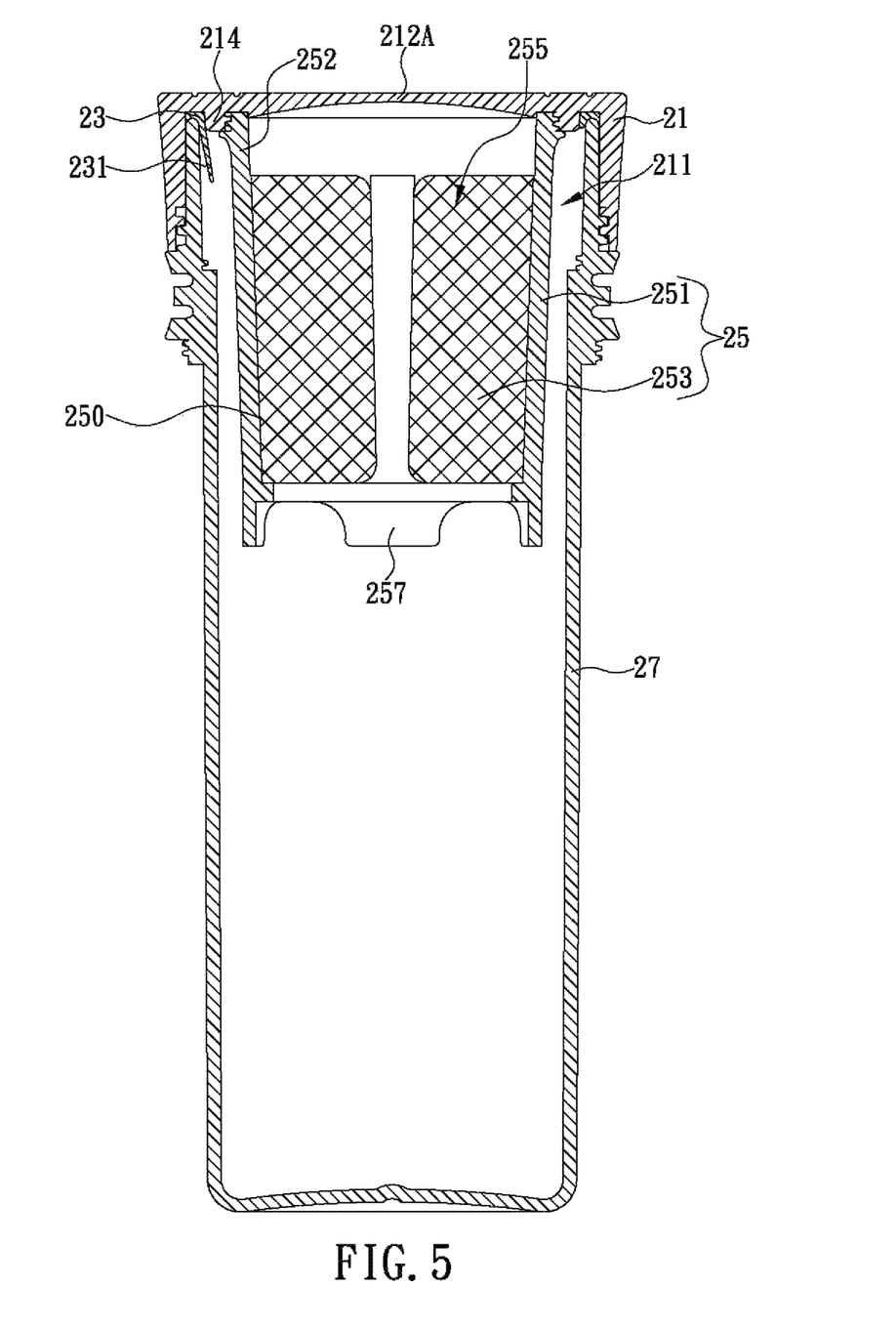
FIG. 5 is an assembled sectional view of the first embodiment of the present invention.

As shown in FIG. 3 and FIG. 4, the gasket 23, which is made of a waterproof material, is fitted between the outer periphery of the first threaded connection portion 214 and the inner wall 212B. When the lid 21 is assembled to the opening on the top side of the container 27, the gasket 23 is pressed between the lid 21 and the container 27. In addition, the gasket 23 is protrudingly provided with a pulling tab 231. The pulling tab 231 extends slantingly toward the opening 210, and the length by which the pulling tab 231 extends is greater than the height of the first threaded connection portion 214. Thus, when it is desired to remove the gasket 23 for cleaning, the user only has to pull the pulling tab 231 with a thumb and a finger, and the gasket 23 can be easily taken out. Moreover, referring to FIG. 5, the pulling tab 231 also extends toward the central axis of the lid 21 to prevent the top side of the container 27 from pressing the pulling tab 231 while the lid 21 is being threadedly connected to the container 27. Should such pressing occur, the tightness of the threaded connection between the lid 21 and the container 27 will be compromised. Now that the pulling tab 231 is kept from contact with the top side of the container 27 in the course in which the lid 21 is threadedly connected to the container 27, a tight threaded connection between the lid 21 and the container 27 is ensured.

Referring back to FIG. 3 and FIG. 4, the filter 25 includes a hollow frame 251 and at least one filter screen 253. The hollow frame 251 has a middle section peripherally formed with at least one hole 250 (with four holes 250 formed in this embodiment by way of example). The top side of the filter 25 is provided with a second threaded connection portion 252. The outer periphery of the second threaded connection portion 252 is provided with threads. The threads on the outer periphery of the second threaded connection portion 252 can threadedly engage with the threads on the inner periphery of the first threaded connection portion 214 so that the second threaded connection portion 252 and the first threaded connection portion 214 are threadedly connected to each other in the assembly space 211, allowing the top side of the filter 25 to be fixed in the lid 21 while the bottom side of the filter 25 is exposed outside the opening 210 of the lid 21. With the at least one filter screen 253 coating the at least one hole 250 and a bottom through hole 254 of the filter 25, a receiving space 255 is formed in the hollow frame 251. A brewing material (e.g., tea leaves, ground coffee, etc.) can be put into the receiving space 255 through a top through hole 256 of the hollow frame 251. When it is desired to detach the filter 25 from the lid 21 for cleaning, the user only has to hold the filter 25 by a lower periphery thereof and turn the filter 25, and the filter 25 can be readily separated from the lid 21. As the filter 25 need not be deformed in the detachment process, the service life of the filter 25 will be substantially increased in comparison with those of its prior art counterparts.

Figure 6:
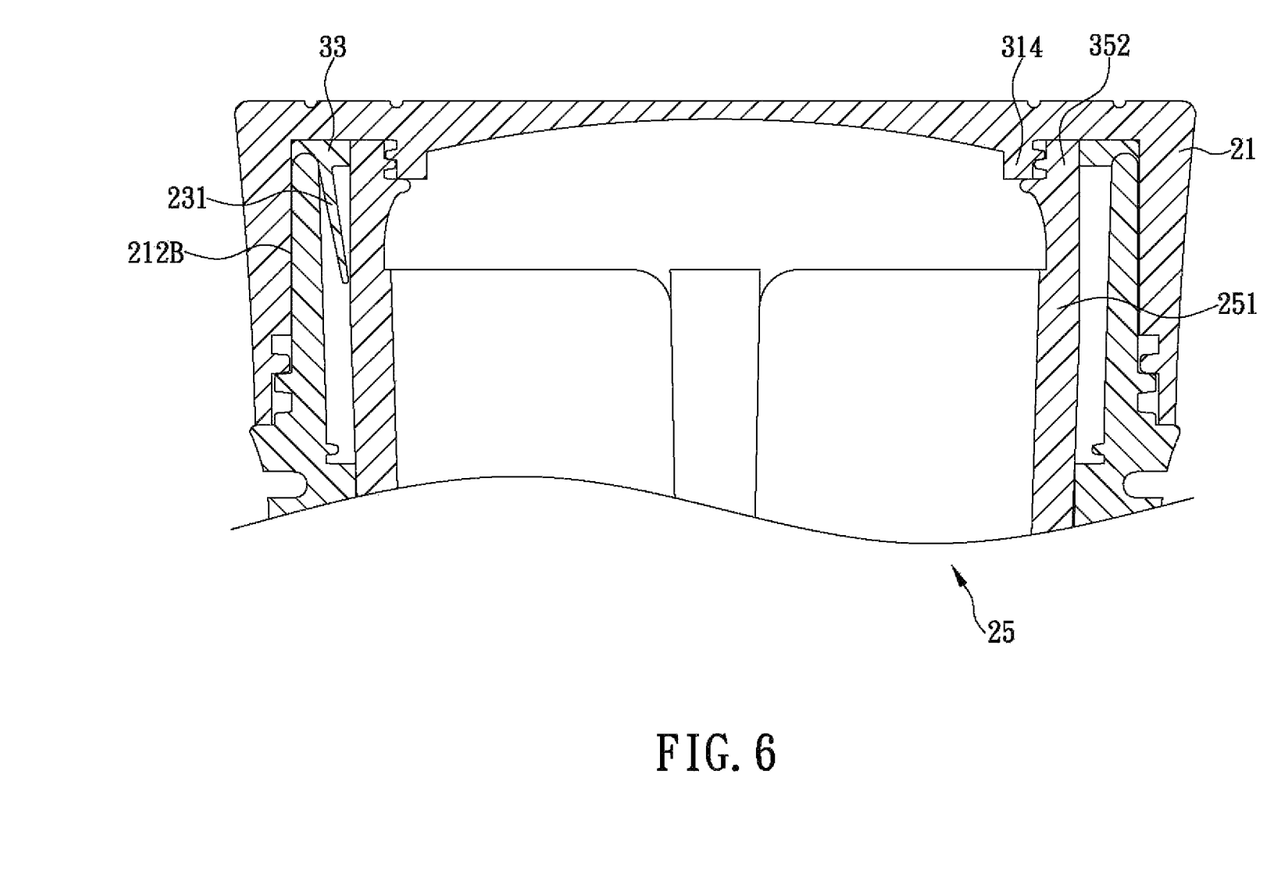
FIG. 6 is a partial assembled sectional view of the second embodiment of the present invention.

Referring to FIG. 3 and FIG. 4, the bottom side of the hollow frame 251 is further protrudingly provided with a plurality of legs 257. The legs 257 enable the filter 25 to stand on a plane. In a different embodiment of the present invention, however, the legs 257 may be dispensed with according to product design. Besides, the locations of the gasket and the threads of the first and the second threaded connection portions may be different from those illustrated in the first embodiment. For example, in the second embodiment of the present invention as shown in FIG. 6, in which all the reference numerals are the same as those in the first embodiment except for elements that are further modified, the first threaded connection portion 314 of the lid 21 has a threaded outer periphery, and the second threaded connection portion 352 of the hollow frame 251 has a threaded inner periphery. The first threaded connection portion 314 is threadedly engageable with the second threaded connection portion 352 to fix the filter 25 to the lid 21. In addition, the gasket 33 is located and held between the outer periphery of the second threaded connection portion 352 and the inner wall 212B. Hence, in the second embodiment, the gasket 33 can be easily removed after detachment of the filter 25 and can do without the pulling tab 231. In other embodiments of the present invention, however, it is feasible to situate the gasket 33 between the outer periphery of the first threaded connection portion 314 and the inner wall 212B as in the first embodiment while the first threaded connection portion 314 and the second threaded connection portion 352 are of the configurations shown in the second embodiment. In that case, the gasket 33 will be pressed by the second threaded connection portion 352 when the filter 25 is threadedly connected to the lid 21.

According to the above, referring back to FIG. 3 and FIG. 4, a user can make a drink (e.g., tea or coffee) by putting a brewing material into the filter 25, connecting the filter 25 threadedly to the lid 21, and connecting the lid 21 threadedly to the container 27 such that the brewing material is steeped in a liquid (e.g., water) in the container 27. After the brewing material is steeped for the required amount of time, the user only has to remove the lid 21, which can be left standing in a housing or on a flat surface by means of the legs 257 of the filter 25, and the drink can be drunk directly from the container 27. When it is desired to clean the components of the lid 21, the filter 25 can be removed from the lid 21 simply by rotating the filter 25, and the gasket 23 can be easily and rapidly removed via the pulling tab 231. Since no tool is required for taking out the gasket 23, cleaning is made easy. Compared with the lids of the conventional brewers, the structural design of the lid 21 disclosed herein features fast disassembly and increased convenience in terms of cleaning.

While the invention herein disclosed has been described by means of specific embodiments, numerous modifications and variations could be made thereto by those skilled in the art without departing from the scope of the invention set forth in the claims.

What is claimed is:

1. A lid structure configured for easy disassembly and cleaning, comprising:
    a lid having a bottom side provided with an opening, the lid being concavely provided with an assembly space corresponding in position to the opening, the lid having an inner wall which corresponds in position to the opening and is protrudingly provided with a first threaded connection portion extending toward the opening, the first threaded connection portion having an inner periphery provided with threads;
    a gasket fitted around an outer periphery of the first threaded connection portion and protrudingly provided with a pulling tab, the pulling tab extending toward the opening, wherein when the lid is assembled to an opening on a top side of a container, the gasket is pressed between the lid and the container; and
    a filter comprising a hollow frame and at least one filter screen, the hollow frame having a middle section peripherally formed with at least one hole, the hollow frame having a top side provided with a second threaded connection portion, the second threaded connection portion having an outer periphery provided with threads, wherein the threads on the outer periphery of the second threaded connection portion are threadedly engageable with the threads on the inner periphery of the first threaded connection portion so that the second threaded connection portion and the first threaded connection portion are connected together in the assembly space to fix the top side of the filter in the lid while a bottom side of the filter is exposed outside the opening of the lid, the at least one filter screen coating the at least one hole and a bottom through hole of the hollow frame such that a receiving space is formed in the hollow frame.

2. The lid structure of claim 1, wherein the pulling tab extends by a length greater than a height of the first threaded connection portion.

3. The lid structure of claim 2, wherein the pulling tab extends slantingly toward a central axis of the lid.

4. The lid structure of claim 3, wherein the hollow frame has a bottom side protrudingly provided with a plurality of legs.

5. A lid structure configured for easy disassembly and cleaning, comprising:
    a lid having a bottom side provided with an opening, the lid being concavely provided with an assembly space corresponding in position to the opening, the lid having an inner wall which corresponds in position to the opening and is protrudingly provided with a first threaded connection portion extending toward the opening, the first threaded connection portion having an outer periphery provided with threads;
    a filter comprising a hollow frame and at least one filter screen, the hollow frame having a middle section peripherally formed with at least one hole, the hollow frame having a top side provided with a second threaded connection portion, the second threaded connection portion having an inner periphery provided with threads, wherein the threads on the inner periphery of the second threaded connection portion are threadedly engageable with the threads on the outer periphery of the first threaded connection portion so that the second threaded connection portion and the first threaded connection portion are connected together in the assembly space to fix the top side of the filter in the lid while a bottom side of the filter is exposed outside the opening of the lid, the at least one filter screen coating the at least one hole and a bottom through hole of the hollow frame such that a receiving space is formed in the hollow frame; and
    a gasket fitted around an outer periphery of the second threaded connection portion so that, when the filter is assembled to the lid and the lid is assembled to an opening on a top side of a container, the gasket is pressed between the lid and the container.

6. The lid structure of claim 5, wherein the gasket is protrudingly provided with a pulling tab extending toward the opening of the lid.

7. The lid structure of claim 6, wherein the pulling tab extends slantingly toward a central axis of the lid.

8. The lid structure of claim 7, wherein the hollow frame has a bottom side protrudingly provided with a plurality of legs.

9. A lid structure configured for easy disassembly and cleaning, comprising:
    a lid having a bottom side provided with an opening, the lid being concavely provided with an assembly space corresponding in position to the opening, the lid having an inner wall which corresponds in position to the opening and is protrudingly provided with a first threaded connection portion extending toward the opening, the first threaded connection portion having an outer periphery provided with threads;
    a filter comprising a hollow frame and at least one filter screen, the hollow frame having a middle section peripherally formed with at least one hole, the hollow frame having a top side provided with a second threaded connection portion, the second threaded connection portion having an inner periphery provided with threads, wherein the threads on the inner periphery of the second threaded connection portion are threadedly engageable with the threads on the outer periphery of the first threaded connection portion so that the second threaded connection portion and the first threaded connection portion are connected together in the assembly space to fix the top side of the filter in the lid while a bottom side of the filter is exposed outside the opening of the lid, the at least one filter screen coating the at least one hole and a bottom through hole of the hollow frame such that a receiving space is formed in the hollow frame; and a gasket fitted around the outer periphery of the first threaded connection portion and protrudingly provided with a pulling tab, the pulling tab extending toward the opening, wherein when the lid is assembled to an opening on a top side of a container, the gasket is pressed between the lid and the container.

10. The lid structure of claim 9, wherein the pulling tab extends by a length greater than a height of the first threaded connection portion.

* * * * *